(12) United States Patent  
Diamanti et al.

(10) Patent No.: US 10,142,440 B2  
(45) Date of Patent: Nov. 27, 2018

(54) ENFORCED REGISTRY OF COOKIES IN A TIERED DELIVERY NETWORK

(71) Applicant: INTERNATIONAL BUSINESS MACHINES CORPORATION, Armonk, NY (US)

(72) Inventors: Gary F. Diamanti, Wake Forest, NC (US); Yaser K. Doleh, North Royalton, OH (US); Jeffrey W. Lucas, Dunn, NC (US); Mauro Marzorati, Lutz, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 15/223,231

(22) Filed: Jul. 29, 2016

(65) Prior Publication Data

US 2018/0034934 A1 Feb. 1, 2018

(51) Int. Cl.
*H04L 29/08* (2006.01)
*H04L 29/06* (2006.01)
*H04L 29/12* (2006.01)

(52) U.S. Cl.
CPC .......... *H04L 67/2852* (2013.01); *H04L 67/10* (2013.01); *H04L 67/1097* (2013.01); *H04L 67/22* (2013.01); *H04L 67/2804* (2013.01); *H04L 67/42* (2013.01); *H04L 69/22* (2013.01); *H04L 61/1511* (2013.01)

(58) Field of Classification Search
None
See application file for complete search history.

(56) References Cited

U.S. PATENT DOCUMENTS

| | | | |
|---|---|---|---|
| 9,100,365 B2 | 8/2015 | Manani et al. | |
| 9,152,820 B1* | 10/2015 | Pauley, Jr. .......... | G06F 21/6263 |
| 2005/0273849 A1* | 12/2005 | Araujo ................ | H04L 63/0281 |
| | | | 726/12 |
| 2006/0156387 A1* | 7/2006 | Eriksen ................... | H04L 67/02 |
| | | | 726/3 |
| 2009/0106349 A1* | 4/2009 | Harris ..................... | H04L 67/02 |
| | | | 709/203 |
| 2009/0193129 A1* | 7/2009 | Agarwal ............. | H04L 63/0281 |
| | | | 709/229 |
| 2009/0199285 A1* | 8/2009 | Agarwal ............. | H04L 63/0281 |
| | | | 726/9 |
| 2010/0132029 A1* | 5/2010 | Chauhan ............. | H04L 63/0227 |
| | | | 726/12 |

(Continued)

*Primary Examiner* — Joshua Joo
(74) *Attorney, Agent, or Firm* — Griffiths & Seaton PLLC (57) ABSTRACT

Embodiments for enforced registry of cookies in a tiered delivery network by at least a portion of a processor. Information of a cookie may be extracted at a reverse proxy providing access to an application server. Cookie registration rules provided to the registry by an application on the application server may be obtained such that the registry enables the reverse proxy to enforce compliance with the cookie registration rules for each cookie requesting access to the application. The extracted information of the cookie may be compared against the cookie registration rules provided to the registry by the application. The cookie may be suppressed from being relayed to the application upon determining the extracted information is non-compliant with the cookie registration rules.

15 Claims, 7 Drawing Sheets

(56) References Cited

U.S. PATENT DOCUMENTS

| | | | |
|---|---|---|---|
| 2012/0036178 A1* | 2/2012 | Gavini | G06F 9/5027 709/203 |
| 2013/0132552 A1* | 5/2013 | Canning | H04L 65/80 709/223 |
| 2013/0179489 A1* | 7/2013 | Daley | H04L 67/2828 709/203 |
| 2014/0082715 A1* | 3/2014 | Grajek | G06F 17/30876 726/8 |
| 2014/0089661 A1* | 3/2014 | Mahadik | H04L 61/1511 713/162 |
| 2016/0021210 A1* | 1/2016 | Holloway | H04L 61/1511 709/226 |
| 2016/0173615 A1 | 6/2016 | Pattan | |
| 2017/0187631 A1* | 6/2017 | Kamat | H04L 47/125 |

* cited by examiner

ENFORCED REGISTRY OF COOKIES IN A TIERED DELIVERY NETWORK

BACKGROUND OF THE TECHNOLOGY

Field of the Technology

The present technology relates in general to computing systems, and more particularly to, various embodiments for enforced registry of cookies in a tiered delivery network using a computing processor.

Description of the Related Art

Computing systems may be found in the workplace, at home, or at school. Computing systems may include computing and data storage systems to process and store data. Within computing systems, internet cookie is a technology that allows a website server storing a small amount of data into hard disk or memory of a client, or reading data from hard disk of a client. Because of its simplicity, Internet cookie technology has made browsing a web page much easier. Cookies may be used both for providing a superior browsing environment for visiting users, and for collecting information of the visiting users more accurately.

SUMMARY OF THE TECHNOLOGY

Various embodiments for enforced registry of cookies by at least a portion of one or more processors, are provided. In one embodiment, by way of example only, a method for enforced registry of cookies, again by a processor, is provided. Information of a cookie may be extracted at a reverse proxy providing access to an application server. Cookie registration rules provided to the registry by an application on the application server may be obtained such that the registry enables the reverse proxy to enforce compliance with the cookie registration rules for each cookie requesting access to the application. The extracted information of the cookie may be compared against the cookie registration rules provided to the registry by the application. The cookie may be suppressed from being relayed to the application upon determining the extracted information is non-compliant with the cookie registration rules.

BRIEF DESCRIPTION OF THE DRAWINGS

In order that the advantages of the technology will be readily understood, a more particular description of the technology briefly described above will be rendered by reference to specific embodiments that are illustrated in the appended drawings. Understanding these drawings depict only typical embodiments of the technology and are not therefore to be considered to be limiting of its scope, the technology will be described and explained with additional specificity and detail through the use of the accompanying drawings, in which.

DETAILED DESCRIPTION OF THE DRAWINGS

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flowcharts and processes are provided for clarity in illustrating steps and operations and do not necessarily indicate a particular order or sequence.

In one aspect, as described herein, a cookie may be a small text file stored by a web browser on a user's computer. A cookie may contain information that identifies each user, such as user names and passwords. When a user revisits a web browser, for example, a web server may establish the user's identity by the cookie. More specifically, a cookie may be a hypertext transfer protocol (HTTP) cookie (e.g., web cookie, internet cookies or cookied) that are packets of text that an HTTP server sends to an HTTP client as part of a response. Cookies may be identified by a unique name, and the server domain and a path within the server domain. The client may store the cookies it receives. When the client accesses the server again with an HTTP request, the client attaches to the request any cookies stored for the server domain and path. Cookies may allow servers to maintain specific information about a particular client. Examples of cookie content may include session and/or authentication information, tracking information for usage statistics, user specific site preferences, and dynamic content, such as a shopping cart. A cookie may also specify an expiration date and a flag that it may be sent by the client only when the connection is secure.

Current challenges involving cookies include cookie collisions and inadvertent session hijacking ("cookie hijacking") by unrelated web applications operating in a given namespace. For example, independent application owners operating within a single domain (e.g., example.com) often times choose session cookie settings that collide with each other, through the careless choice of a Cookie Name and Cookie Domain. This causes cookie collisions where one application stomps and interferes on an alternative application's tracking operation leading unsatisfactory user experiences within the computing system.

Accordingly, the present technology provides a solution to manage, track and enforce settings of cookie values to ensure uniqueness within a given namespace. In one aspect, the present technology provides for enforced registry of cookies in a tiered delivery network to prevent spurious cookies from being adjusted, set, interfered, or hijacked by rogue applications in a tiered delivery network environment. In one aspect, a reverse proxy may be employed between the client and the server in a web-based computing system. The enforced registry of cookies may be embodied within a reverse proxy, whereas an actual registry may be embodied within a resilient data store, such as, for example, a domain name system (DNS) or a resilient web service. The enforcement system can operate on both the client-to-server and server-to-client legs of the flow. In one aspect, the DNS may be a hierarchical decentralized naming system for computers, services, or any resource connected to the Internet or a private network. The DNS may associate various information with domain names assigned to each of the participating entities. Most prominently, the DNS may translate more readily memorized domain names to the numerical internet protocol (IP) addresses needed for the purpose of locating and identifying computer services and devices with the underlying network protocols. Thus, the registry of the present technology may be within a data store of the DNS.

In an additional aspect, the mechanisms of the embodiment provide an enforced registry of cookies by one or more computers having at least one or more processors and/or memory. Information of a cookie may be extracted at a reverse proxy providing access to an application server. Cookie registration rules provided to the registry by an application on the application server may be obtained such that the registry enables the reverse proxy to enforce compliance with the cookie registration rules for each cookie requesting access to the application. The extracted information of the cookie may be compared against the cookie registration rules provided to the registry by the application. The cookie may be suppressed from being relayed to the application upon determining the extracted information is non-compliant with the cookie registration rules. Alternatively, the cookie may be granted access and/or relayed to the application upon determining the extracted information is compliant with the cookie registration rules.

It should also be noted that data may be processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

It is understood in advance that although this disclosure includes a detailed description on cloud computing, implementation of the teachings recited herein are not limited to a cloud computing environment. Rather, embodiments of the present technology are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
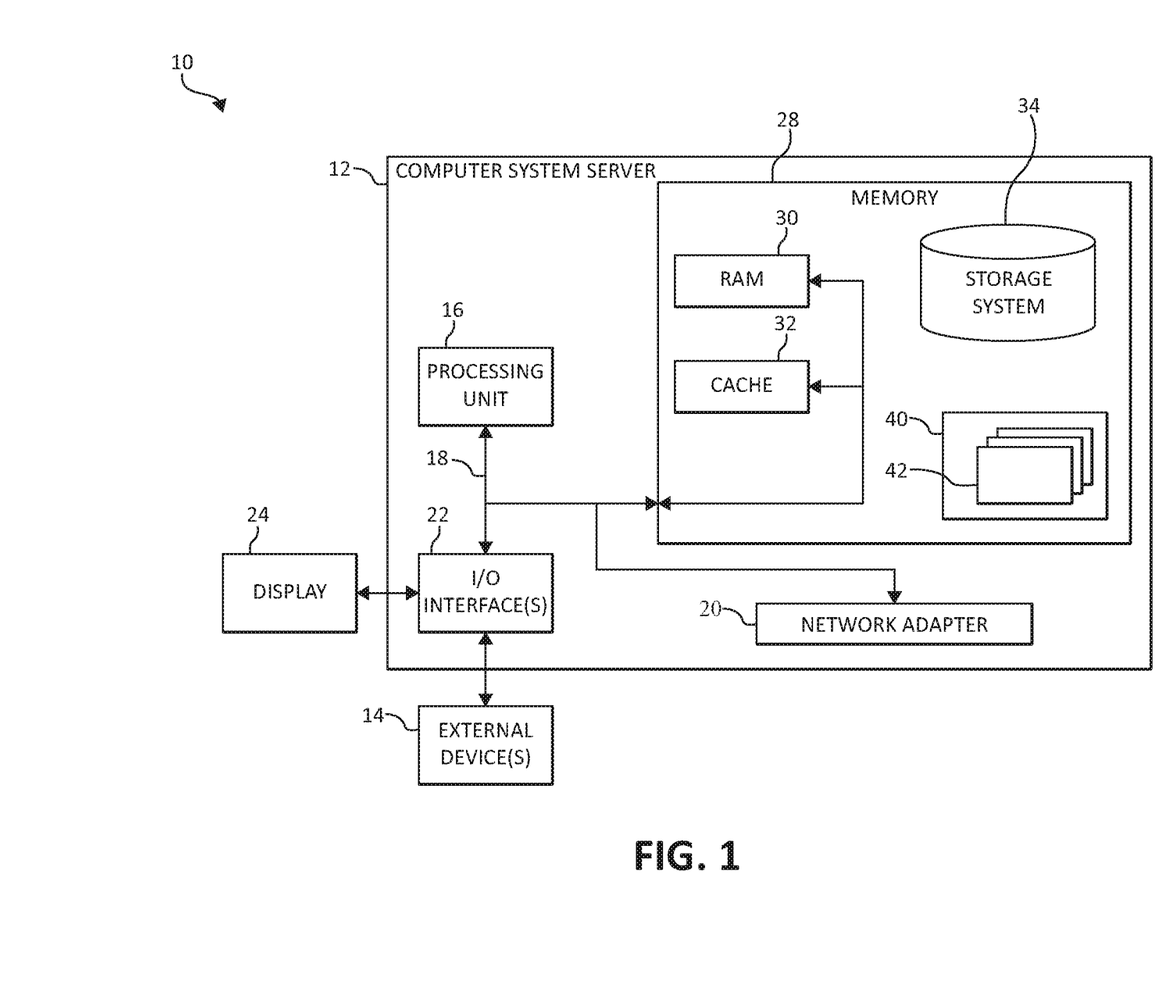
FIG. 1 is a block diagram depicting an exemplary cloud computing node according to an embodiment of the present technology.

Referring now to FIG. 1, a schematic of an example of a cloud computing node is shown. Cloud computing node 10 is only one example of a suitable cloud computing node and is not intended to suggest any limitation as to the scope of use or functionality of embodiments of the technology described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the technology.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the technology as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
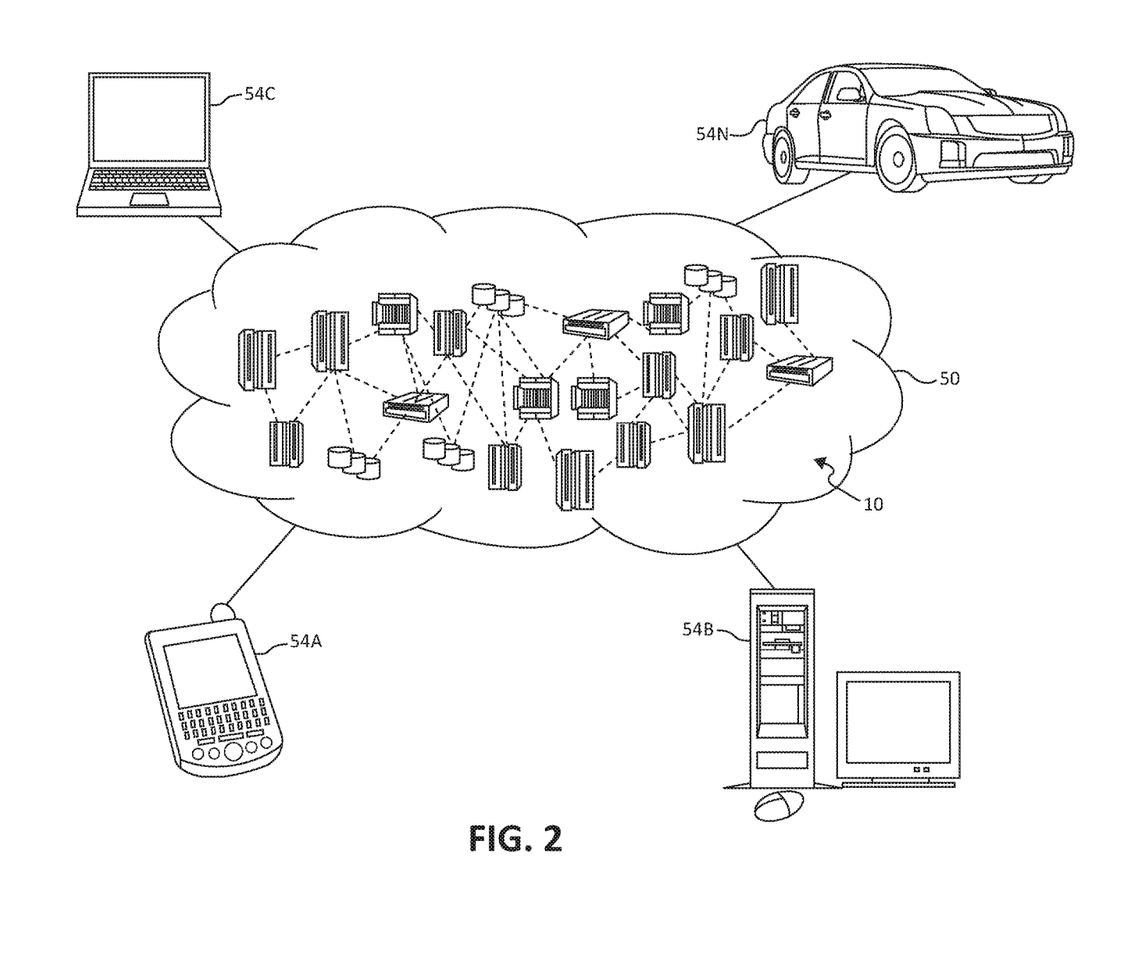
FIG. 2 is an additional block diagram depicting an exemplary cloud computing environment according to an embodiment of the present technology.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
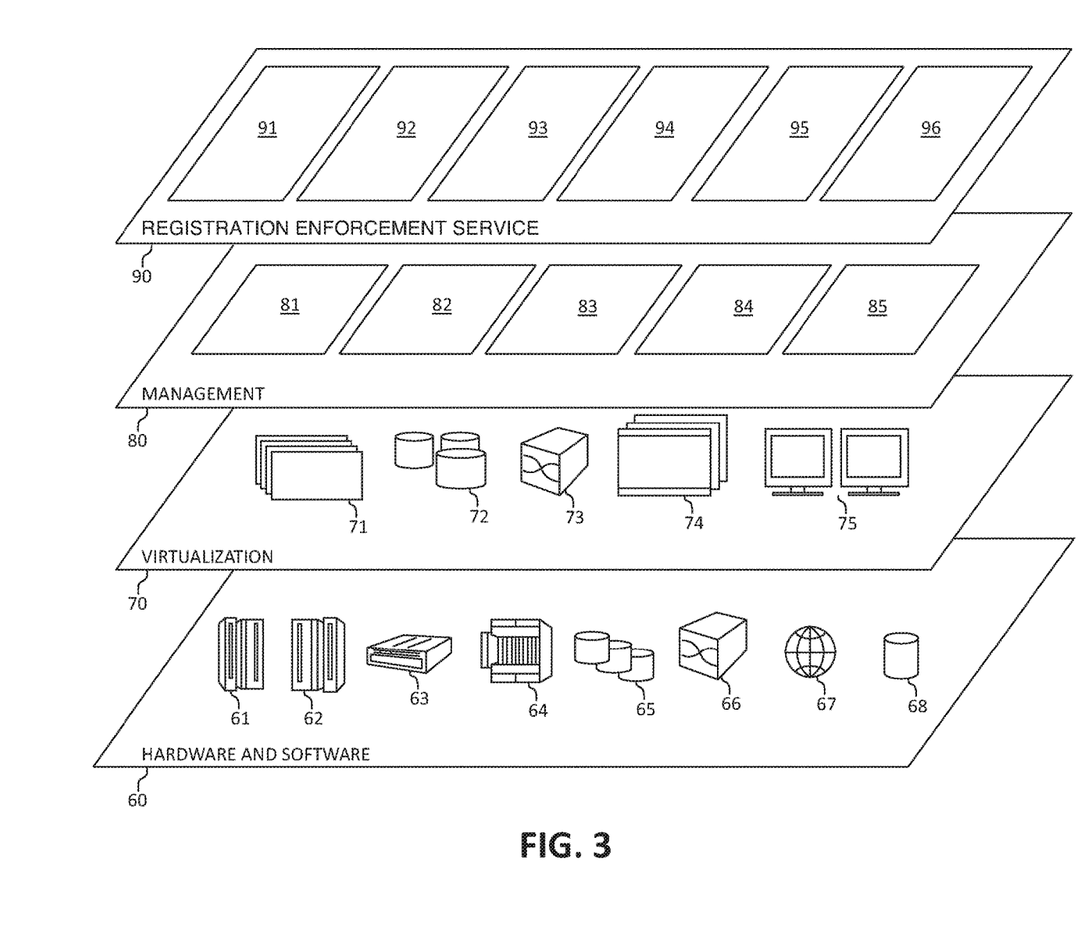
FIG. 3 is an additional block diagram depicting abstraction model layers according to an embodiment of the present technology.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the technology are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 or (aka "registration enforcement services layer") provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present technology, various registration enforcement service workloads and functions 96. In addition, enforced registry of cookies workloads and functions 96 may include such operations as extracting cookie information functionality, enforcement compliance functionality, comparison and matching analytics, cookie registration rules analysis, suppressing cookies from being relayed to an application, and as will be further described, user and device management functions. One of ordinary skill in the art will appreciate that the registration enforcement services workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present technology.

As previously mentioned, the mechanisms of the illustrated embodiments provide novel approaches for managing, tracking, adjusting, or enforcing the setting of cookie values to ensure uniqueness within a given namespace, among other aspects, suppressing the cookie from being relayed to the application upon determining the extracted information is non-compliant with the cookie registration rules, and other factors based, at least in part, on the cookie registration rules obtained from a registry such that the registry enables the reverse proxy to enforce compliance with the cookie registration rules for each cookie requesting access to the application.

As will be further described, in addition to mechanisms for enforcing cookie registration, other aspects of the mechanisms of the illustrated embodiments may include the following. The functionality may include methodologies for adding the suppressed cookie to a black list as an unregistered cookie. The information may be extracted from a set-cookie header of the cookie. That is, extracting the information of the cookie at the reverse proxy further includes extracting at least a path and cookie name from a set-cookie header information of the cookie at the reverse proxy. A compliant set-cookie header may be sent to a user that provided the suppressed cookie. A cookie may be manipulated at the reverse proxy with a compliant set-cookie header according to the cookie registration rules to enforce compliance.

Figure 4:
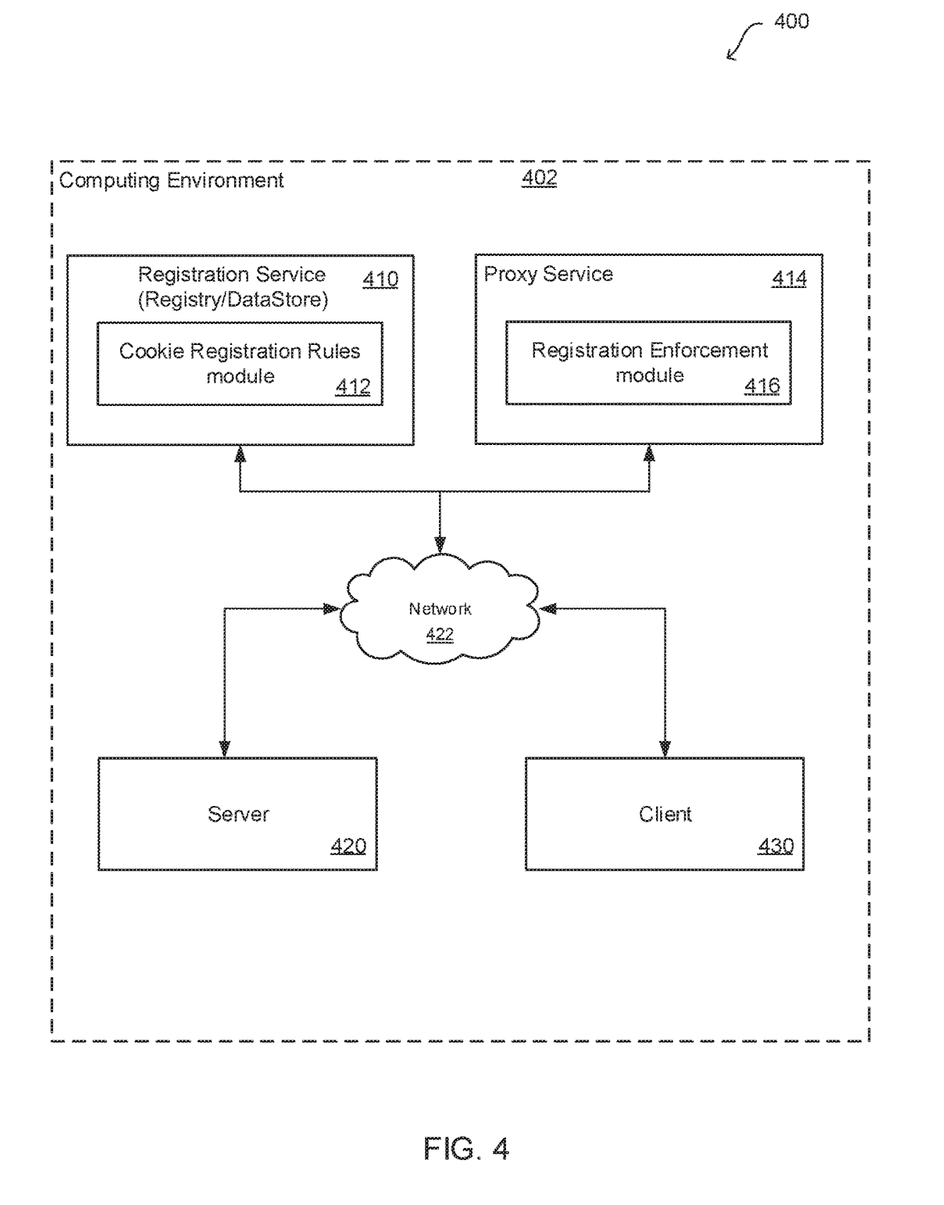
FIG. 4 is an additional block diagram depicting various user hardware and cloud computing components functioning in accordance with aspects of the present technology.

Turning now to FIG. 4, a block diagram depicting exemplary functional components 400 according to various mechanisms of the illustrated embodiments, is shown. FIG. 4 illustrates one or more functions, workloads, and/or protocols for Cookie Registry Enforcement Protocol (CREP). In one aspect, each of the components, modules, and/or functions described in FIGS. 1-3 may also apply to the components, modules, and functions of FIG. 4. For example, in one aspect, the computing environment 402 may include computer system/server 12, incorporating processing unit 16 to perform various computational, data processing, workloads, and other functionality in accordance with various aspects of the present technology. As one of ordinary skill in the art will appreciate, the depiction of the various functional units in computer system/server 12 is for purposes of illustration of the figures as described herein as FIG. 4, as the functional units may be located within computer system/server 12 or elsewhere within and/or between distributed computing components. In one aspect, the computing environment 402 may provide virtualized computing services (i.e., virtualized computing, virtualized storage, virtualized networking, etc.). More specifically, the computing environment 402 may include and/or be associated with a virtual computing environment that provides virtualized computing, virtualized storage, virtualized networking and other virtualized services that are executing on a hardware substrate.

In one aspect, the computing environment 402 may include a registration service 410 in order to allow registration of one or more cookie registration rules, requirements, or parameters. The registration service 410 may also include a cookie registration rules module 412, containing cookie information, such as attributes, profiles, rules, requirements, parameters, or other information pertaining to cookies. The computing environment 402 may also include a proxy service 414, which may include a registration enforcement module 416, to enforce that each cookie is compliant with one or more cookie registration attributes, profiles, rules, requirements, or parameters. Also, the computing environment 402 may provide data communication between the registration service 410, proxy service 414, server 420, and/or client 430 via the network 422.

In one aspect, CREP of the computing environment 402 may employ one or more various mathematical operations (e.g., using addition, subtraction, division, multiplication, standard deviations, means, averages, statistical modeling using statistical distributions, etc.) and undergo various data analytics functions. As part of the CREP, a client, such as client 430, may issue to a server, such as server 420, a cookie. However, the cookie is sent to the server 420 via the proxy service 414. The registration enforcement module 416 may extract information of one or more cookies that may be extracted at a reverse proxy (e.g., proxy service 414) providing access to an application server, such as server 420. The registration enforcement module 416 may obtain the cookie registration rules or requirements from the cookie registration rules module 412, which have been provided to the registry of the registration service 410 by an application on the application server 420 such that the registry enables the reverse proxy to enforce compliance with the cookie registration rules for the one or more cookies requesting access to the application of the application server 420. The registration enforcement module 416 may compare in order to match the extracted information of the one or more cookies against the cookie registration rules obtained from the cookie registration rules module 412 provided to the registry (e.g., registration service 410) by the application of the application server 420. The registration enforcement module 416 may suppress those of the one or more cookies from being relayed to the application server 420 from the client 430 upon determining the extracted information is non-compliant with the cookie registration rules according to the comparison. Alternatively, registration enforcement module 416 may relay and allow to pass successfully through the proxy service 414, those of the one or more cookies to the application server 420 upon determining the extracted information is compliant with the cookie registration rules.

Consider the following example of an implementation of the aforementioned functionality. In one aspect, an application server (e.g., server 420) may enter specific cookie requirements into a registration service 410, or more specifically, the cookie registration rules. The registration enforcement module 416 may require each cookie be compliant with the cookie registration rules. That is, enforced registry of cookies may be embodied within the proxy service 414 (e.g., a reverse proxy), whereas an actual registry may be embodied within a registration service 410. The registry may be a resilient data store within a domain name system (DNS) or a web service. For example, the DNS may use domain keys identified mail (DKIM) syntax and/or an HTTP may use the web service or may employ a JavaScript Object Notation (JSON) object. The registration of the cookie rules, which may be located in the cookie registration rules module 412, may include a cookie name, host domain, and path. The registration service 410 (e.g., the registry or data store) provides access to a registry that does not contain the actual cookies, but rather, the registration service 410 may only include the cookie registration rules, requirements, or parameters for a cookie. For example, if the registry is DNS, than the selector, name, and path may be indicated as (_selector._crep.domain 86400 IN TXT "v=CREP1 name=cookiename issuer=www-ext.examplebusiness.com.cs186.net path=/account/us/en/ domain=www.examplebusiness.com). In an additional example, if the registry is provided by a web service, then the selector, name, and path may be indicated as the information in the text record as (URL https://domain/crep/selector), which may be indicated as a JSON object. An application compliant with the registration service may issue cookies with overload path and domain tokens. The domain token may point to the domain value in the registry and the path may point to the selector where "slashes" may be replaced with "dashes" (e.g., Set-Cookie: cookiename=cookievalue; path=/selector; domain=www.examplebusiness.com; expires=Tue, 1 Jan. 1970 00:00:00). The registration enforcement module 416 operating as an enforcement component may extract the selector, path and cookie name from the set-cookie header and may perform a corresponding lookup in the registry provided by the registration service 410.

It should be noted that, an application owner that issued a cookie is matched with an application in the registry, the information extracted from the registry may be used to construct a set-cookie header that matches the registered details (e.g., Set-Cookie: cookiename=cookievalue path=/ account/us/en/domain=www.examplebusiness.com). In one aspect, the registration enforcement module 416 may be set to a permissive operations status capable of being selectively activated and/or deactivated. That is, in the permissive operation state, the received cookies (e.g., received at the proxy service 414) present in the cookie and set-cookie headers may be passed unaltered, without any changes, to a server and/or client. Alternatively, a cleaning operation may be performed on the cookies while the registration enforcement module 416 may be set to a permissive operations status. The cleaning operation may retrieve all cookies of a cookie data store to adjust, reset, evict, and/or expunge those cookies having non-compliant cookie information as compared to the cookie information provided by the registry.

It should be noted that from the perspective of the requester (e.g., the request side), for each cookie contained in the received cookie header from the client that is not registered, the cookies may be suppressed from the request sent to the server. A notation may be noted made to issue a "delete cookie" response set-cookie header back to the client along with the server's response. The request details (e.g., URL, referrer, date, User-Agent, and the like) may be saved in a "black list" indexed by the received cookie value for later analysis or other workflow functionality. The received set-cookie header at the proxy service may be suppressed from the response sent to the client.

From the perspective of the response perspective (e.g., the response side of the proxy server), for each cookie contained in the received set-cookie header from the server that is not registered, cookies may be suppressed from the response sent to the server. If a notation was made to issue a "delete cookie" on the request side, a set-cookie header with a pre-expired date may be appended to the response back to the client. The request details (URL, Referrer, date, User-Agent, and the like) may be saved in a "black list" indexed by the issued cookie value for later analysis. The received set-cookie header may be suppressed from the response sent to the client.

Figure 5:
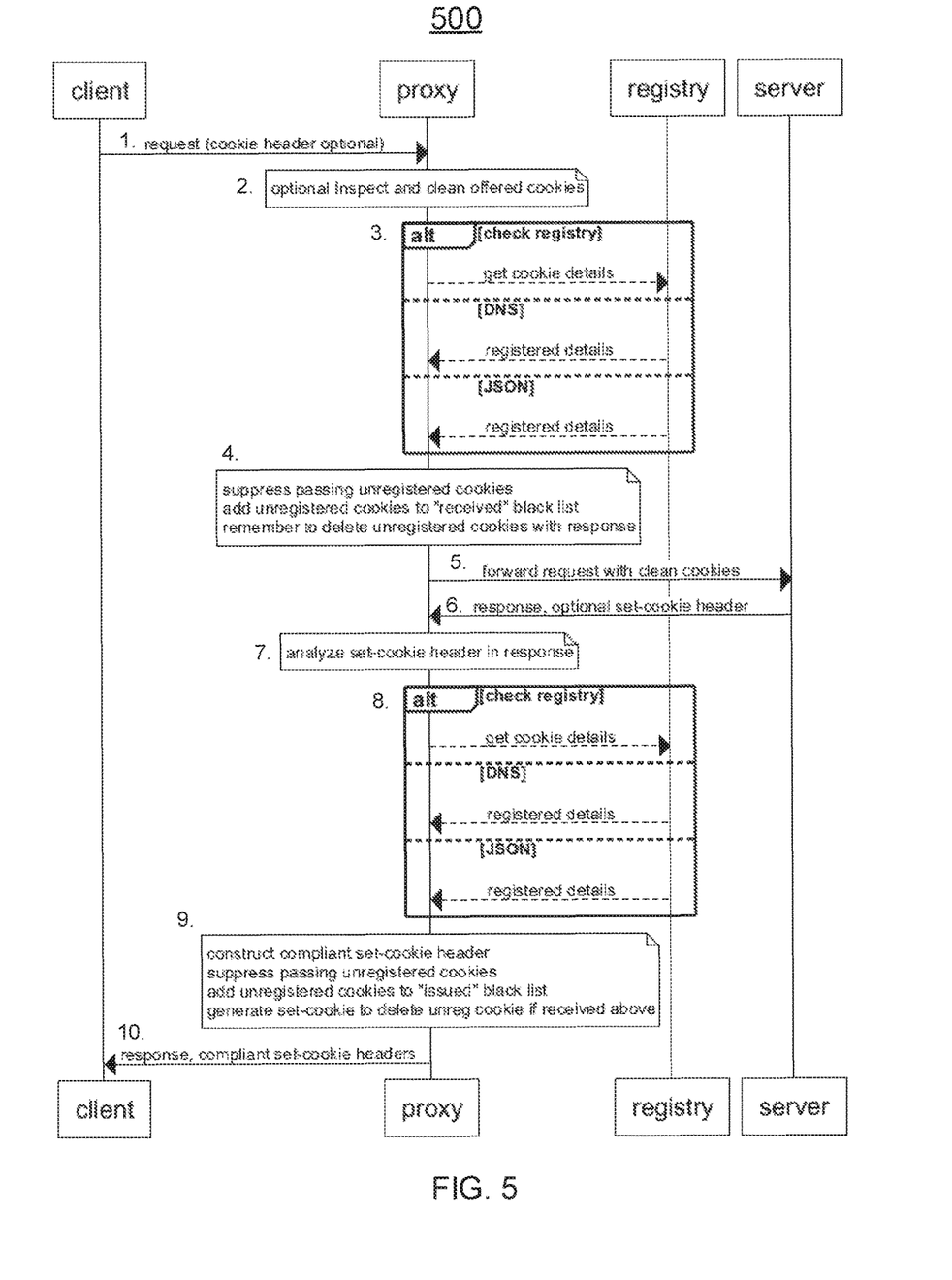
FIG. 5 is a flow diagram depicting an exemplary method for enforced registry of cookies in a tiered delivery network in which aspects of the present technology may be realized.

Turning now to FIG. 5, a flow diagram depicting exemplary functional components 500 according to various mechanisms of the illustrated embodiments, is shown. FIG. 5 illustrates one or more functions, workloads, and/or protocols for Cookie Registry Enforcement Protocol (CREP). In one aspect, each of the components, modules, and/or functions described in FIGS. 1-4 may also apply to the components, modules, and functions of FIG. 5. The components, modules, and/or functions described in FIG. 5 may include a client, a proxy, a registry, and a server. Consider the following example of an implementation of the functionality of FIG. 5. 1) A client may send to a proxy a cookie or issue a request for an application. The cookie header may be included in the request. 2) The proxy may optionally select to inspect and clean the received cookies. That is, the set-cookie header may be manipulated to contain data that is compliant with one or more cookie rules or registration requirements provided to the registry by the server to enforce compliance with the cookie rules or registration requirements. As an optional step (e.g., "alt" in FIG. 5), the proxy may check the registry by requesting cookie details pertaining to a specified application of the server. The registry (e.g., a DNS or web service) may provide the registered cookie details, rules, and/or regulations parameters provided by the application of the server. 4) The proxy may suppress passing the cookie that is unregistered (e.g., the cookie does not comply with the registered cookie details, rules, and/or regulations parameters for accessing a specified application). The proxy may add the unregistered cookies to a black list. The black list indicates those cookies that are to be blocked from access to a web browser or application of a server. A notification may also be indicated to delete the unregistered cookies with a response to the server. In one aspect, the proxy may manipulate the cookie at the proxy with a compliant set-cookie header according to the cookie registration rules to enforce compliance. The cookie registration rules may include at least a cookie name, a host domain, and a path to enforce compliance for each cookie requesting access to the application. The registry may be located within data store of a Domain Name System (DNS) or a web service.

5) The proxy may forward the request to the server with compliant cookies. The proxy may send to the server a compliant set-cookie header to the application that provided the suppressed cookie. 6) A response from the server may be received at the proxy with a set-cookie header. 7) The proxy may use various analytic functions or workflows to analyze the set-cookie header received in the response. 8) As an alternative function (e.g., "alt") the proxy check the registry by requesting cookie details pertaining to a specified application of the server. The registry (e.g., a DNS or web service) may provide the registered cookie details, rules, and/or regulations parameters provided by the application of the server. 9) The proxy may create or construct a compliant set-cookie header, suppress passing the unregistered cookies, add the unregistered cookies to black list, and/or generate a set-cookie notification to delete the unregistered cookies. 10) The proxy may send a response with the compliant set-cookie headers to the client.

Figure 6:
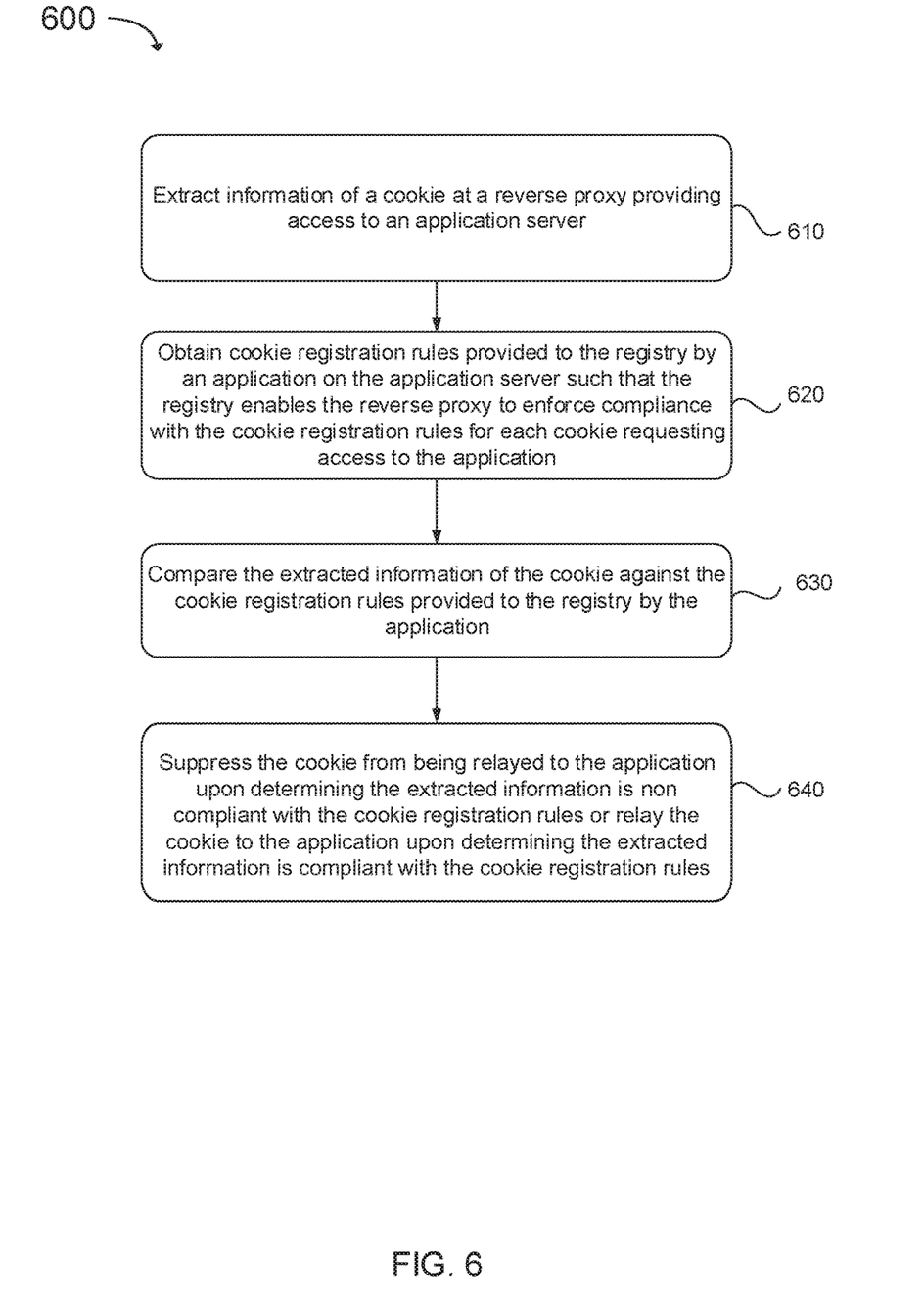
FIG. 6 is a flowchart diagram depicting an exemplary method for enforcing registry of cookies by a processor, in which aspects of the present technology may be realized.

Turning now to FIG. 6, a method 600 for enforced registry of cookies by a processor is depicted, in which various aspects of the illustrated embodiments may be implemented. That is, FIG. 6 is a flowchart of an additional example method 600 for enforced registry of cookies in tiered delivery network of a computing environment according to an example of the present technology. The functionality 600 may be implemented as a method executed as instructions on a machine, where the instructions are included on at least one computer readable medium or one non-transitory machine-readable storage medium. Starting in block 610, information of a cookie may be extracted at a proxy (e.g., reverse proxy) providing access to an application of an application server. Cookie registration rules provided to a registry by an application on the application server may be obtained such that the registry enables the reverse proxy to enforce compliance with the cookie registration rules for each cookie requesting access to the application, as in block 620. The extracted information of the cookie may be compared (in order to match) against the cookie registration rules provided to the registry by the application, as in block 630. The cookie may be suppressed from being relayed to the application upon determining the extracted information is non-compliant with the cookie registration rules or relayed to the application upon determining the extracted information is compliant with the cookie registration rules, as in block 640.

Figure 7:
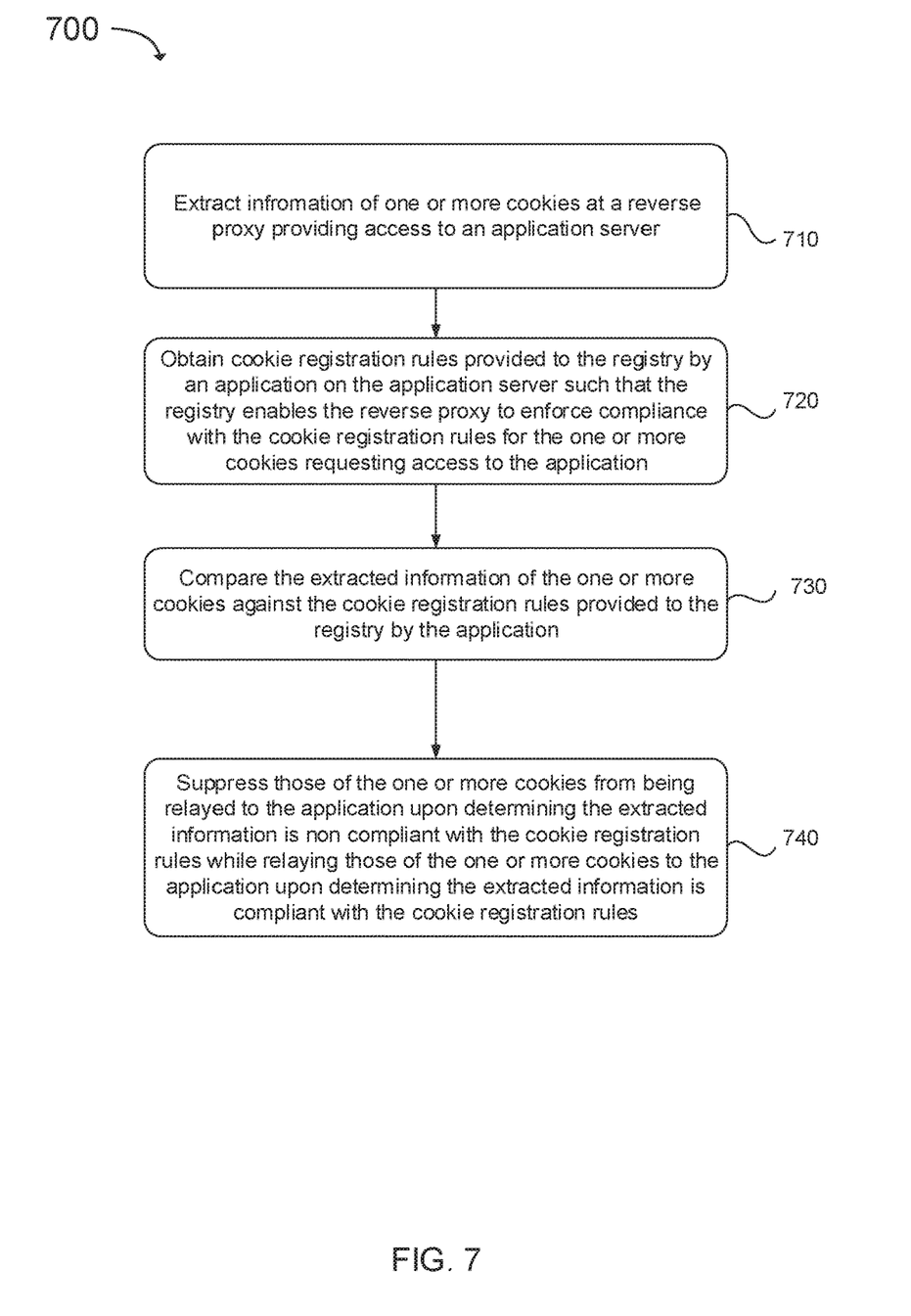
FIG. 7 is an additional flowchart diagram depicting an additional exemplary method for enforcing registry of cookies by a processor, again in which aspects of the present technology may be realized.

Turning now to FIG. 7, a method 700 for enforced registry of cookies by a processor is depicted, in which various aspects of the illustrated embodiments may be implemented. That is, FIG. 7 is a flowchart of an additional example method 700 for enforced registry of cookies in tiered delivery network of a computing environment according to an example of the present technology. The functionality 700 may be implemented as a method executed as instructions on a machine, where the instructions are included on at least one computer readable medium or one non-transitory machine-readable storage medium. Starting in block 710, information may be extracted and analyzed from one or more cookies at a proxy providing access to one or more applications of an application server. Cookie registration rules provided to a registry by an application on the application server may be obtained such that the registry enables the reverse proxy to enforce compliance with the cookie registration rules for the one or more cookies requesting access to the application, as in block 720. The extracted information of the one or more cookies may be compared against the cookie registration rules provided to the registry by the application, as in block 730. Those of the one or more cookies from being relayed to the application may be suppressed at the proxy upon determining the extracted information is non-compliant with the cookie registration rules or relay those of the one or more cookies (e.g., compliant cookies) to the application upon determining the extracted information from the compliant cookie is compliant with the cookie registration rules, as in block 740.

In one aspect, in conjunction with and/or as part of at least one block of FIGS. 6-7, the operations of 600 and/or 700 may include each of the following. The operations of 600 and/or 700 may include adding the suppressed cookie to a black list as an unregistered cookie. Also, the extracted information may be extracted from a set-cookie header of the cookie. The operations of 600 and/or 700 may include sending compliant set-cookie header to a user that provided the suppressed cookie. Also, the operations of 600 and/or 700 may include manipulating the cookie at the reverse proxy with a compliant set-cookie header according to the cookie registration rules to enforce compliance, and/or sending the compliant set-cookie header according to the cookie registration rules to an application that provided the cookie registration rules. The cookie registration rules may include at least a cookie name, a host domain, and a path to enforce compliance for each cookie requesting access to the application, wherein the registry is located within data store of a Domain Name System (DNS) or a web service.

The present technology may be a system, a method, and/or a computer program product. The computer program product may include a computer readable storage medium (or media) having computer readable program instructions thereon for causing a processor to carry out aspects of the present technology.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technology.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present technology. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for enforced registry of cookies in a computing network, comprising:
   extracting information of a cookie at a reverse proxy
      providing access to an application server, including extracting at least a path and cookie name from a set-cookie header information of the cookie at the reverse proxy;

obtaining cookie registration rules provided to the registry by an application on the application server such that the registry enables the reverse proxy to enforce compliance with the cookie registration rules for each cookie requesting access to the application;

comparing the extracted information of the cookie against the cookie registration rules provided to the registry by the application; and suppressing the cookie from being relayed to the application upon determining the extracted information is non-compliant with the cookie registration rules while relaying the cookie to the application upon determining the extracted information is compliant with the cookie registration rules.

2. The method of claim 1, further including adding the suppressed cookie to a black list as an unregistered cookie.

3. The method of claim 1, further including sending a compliant set-cookie header to a user that provided the suppressed cookie.

4. The method of claim 1, further including:

manipulating the cookie at the reverse proxy with a compliant set-cookie header according to the cookie registration rules to enforce compliance; or sending the compliant set-cookie header according to the cookie registration rules to an application that provided the cookie registration rules.

5. The method of claim 1, wherein the cookie registration rules include at least a cookie name, a host domain, and a path to enforce compliance for each cookie requesting access to the application, wherein the registry is located within data store of a Domain Name System (DNS) or a web service.

6. A system for enforced registry of cookies in a tiered delivery computing network, comprising:

a processor, operational within and between a distributed computing environment, that:

extracts information of a cookie at a reverse proxy providing access to an application server, including extracting at least a path and cookie name from a set-cookie header information of the cookie at the reverse proxy;

obtains cookie registration rules provided to the registry by an application on the application server such that the registry enables the reverse proxy to enforce compliance with the cookie registration rules for each cookie requesting access to the application;

compares the extracted information of the cookie against the cookie registration rules provided to the registry by the application; and suppresses the cookie from being relayed to the application upon determining the extracted information is non-compliant with the cookie registration rules or relays the cookie to the application upon determining the extracted information is compliant with the cookie registration rules.

7. The system of claim 6, wherein the processor adds the suppressed cookie to a black list as an unregistered cookie.

8. The system of claim 6, wherein the processor sends a compliant set-cookie header to a user that provided the suppressed cookie.

9. The system of claim 6, wherein the processor manipulates the cookie at the reverse proxy with a compliant set-cookie header according to the cookie registration rules to enforce compliance.

10. The system of claim 6, wherein the cookie registration rules include at least a cookie name, a host domain, and a path to enforce compliance for each cookie requesting access to the application, wherein the registry is located within data store of a Domain Name System (DNS) or a web service.

11. A computer program product for, by a processor, enforced registry of cookies, the computer program product comprising a non-transitory computer-readable storage medium having computer-readable program code portions stored therein, the computer-readable program code portions comprising:

an executable portion that extracts information of one or more cookies at a reverse proxy providing access to an application server, including extracting at least a path and cookie name from a set-cookie header information of the cookie at the reverse proxy;

an executable portion that obtains cookie registration rules provided to the registry by an application on the application server such that the registry enables the reverse proxy to enforce compliance with the cookie registration rules for the one or more cookies requesting access to the application;

an executable portion that compares the extracted information of the one or more cookies against the cookie registration rules provided to the registry by the application; and an executable portion that suppresses those of the one or more cookies from being relayed to the application upon determining the extracted information is non-compliant with the cookie registration rules while relaying those of the one or more cookies to the application upon determining the extracted information is compliant with the cookie registration rules.

12. The computer program product of claim 11, further including an executable portion that adds the suppressed cookie to a black list as an unregistered cookie.

13. The computer program product of claim 11, further including an executable portion that sends a compliant set-cookie header to a user that provided the suppressed cookie, wherein the cookie registration rules include at least a cookie name, a host domain, and a path to enforce compliance for the one or more cookies requesting access to the application, wherein the registry is located within data store of a Domain Name System (DNS) or a web service.

14. The computer program product of claim 11, further including an executable portion that manipulates at the reverse proxy the one or more cookies with a compliant set-cookie header according to the cookie registration rules to enforce compliance.

15. The computer program product of claim 11, further including an executable portion that sends an instruction from the reverse proxy to a user to delete the one or more cookies.

* * * * *